No. 829,105. PATENTED AUG. 21, 1906.
H. L. DOHERTY.
PROCESS OF REGULATING THE TEMPERATURE OF COMBUSTION
IN GAS PRODUCERS.
APPLICATION FILED OCT. 25, 1904.
4 SHEETS—SHEET 1.
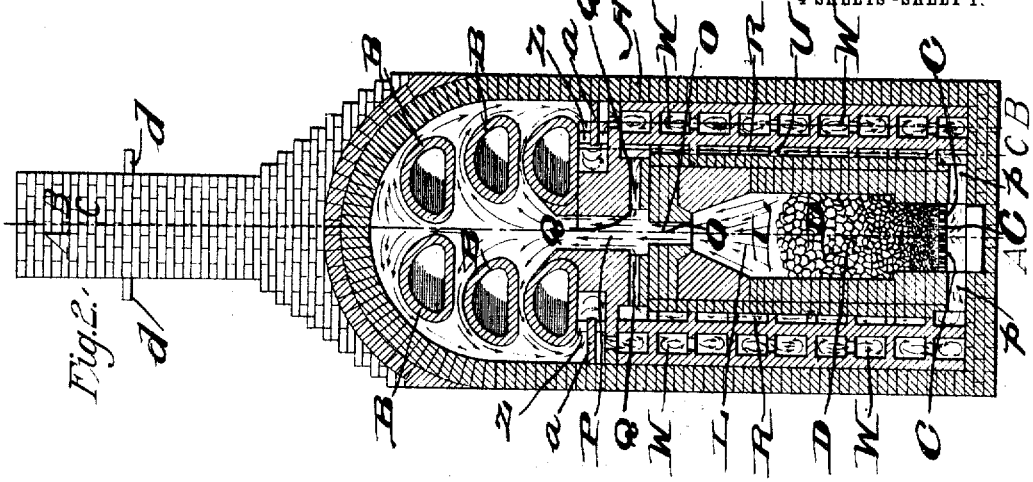
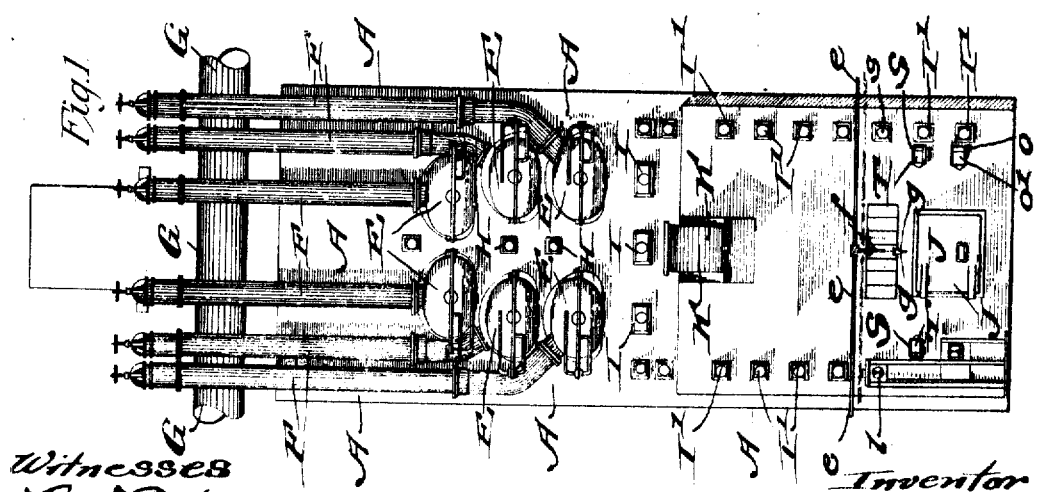

No. 829,105. PATENTED AUG. 21, 1906.
H. L. DOHERTY.
PROCESS OF REGULATING THE TEMPERATURE OF COMBUSTION
IN GAS PRODUCERS.
APPLICATION FILED OCT. 25, 1904.
4 SHEETS—SHEET 2.
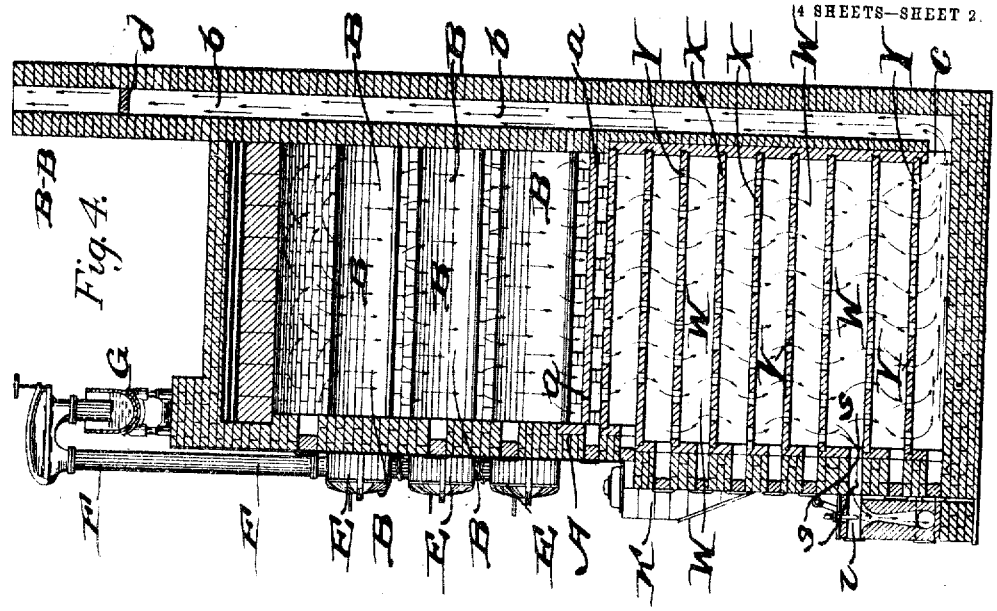
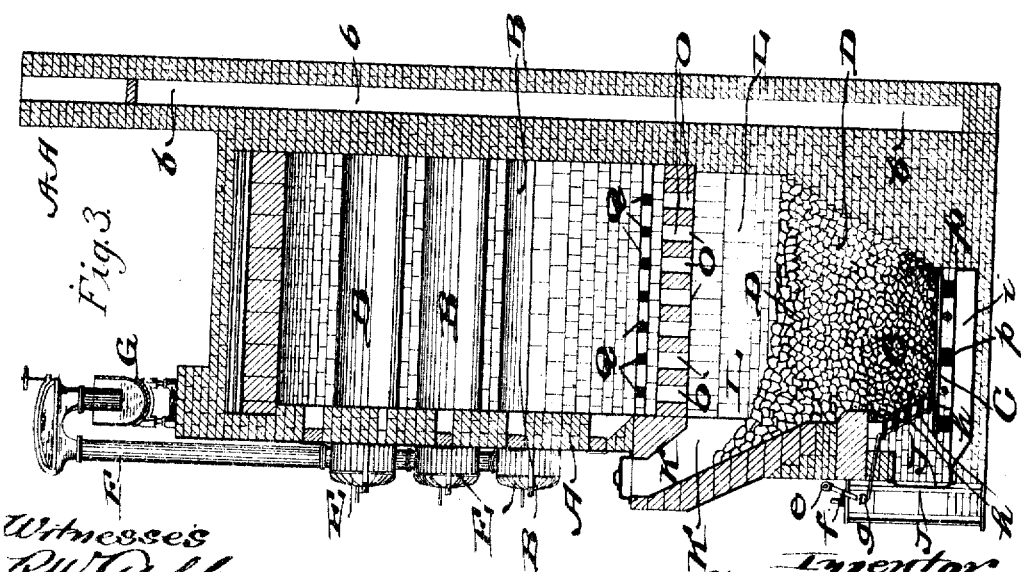

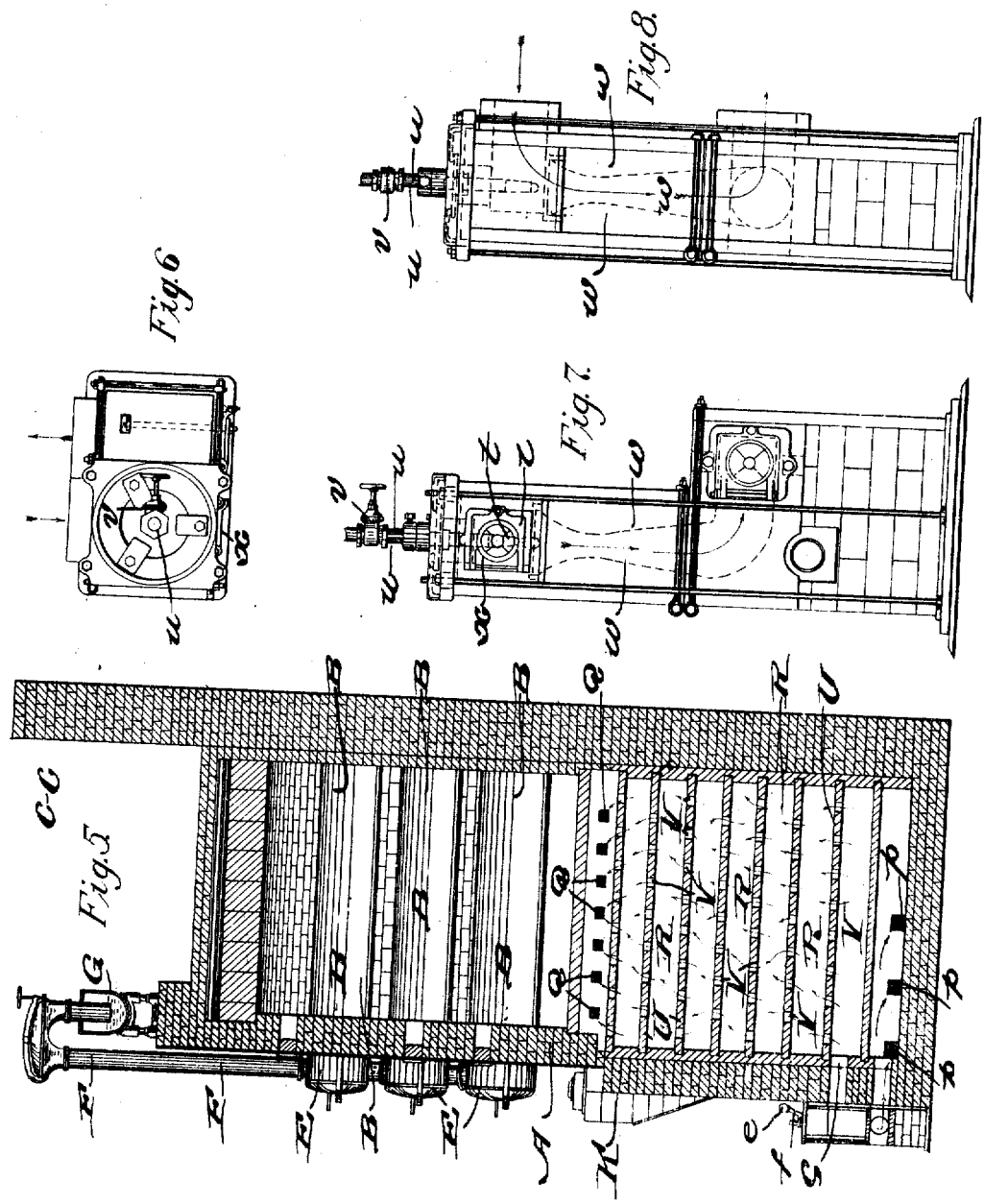

No. 829,105. PATENTED AUG. 21, 1906.
H. L. DOHERTY.
PROCESS OF REGULATING THE TEMPERATURE OF COMBUSTION
IN GAS PRODUCERS.
APPLICATION FILED OCT. 25, 1904.
4 SHEETS—SHEET 4.
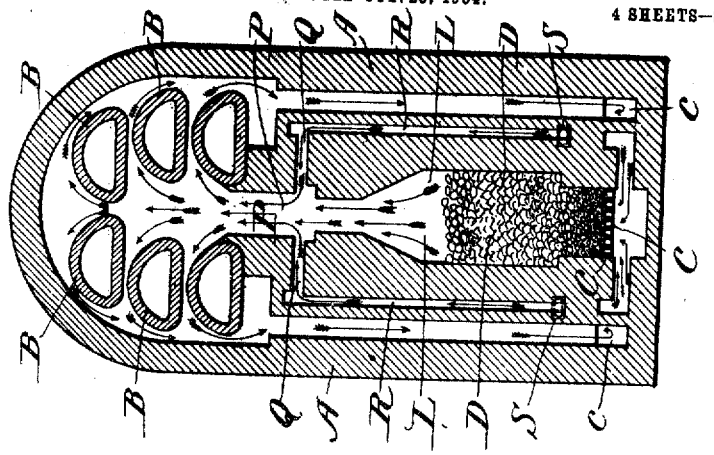
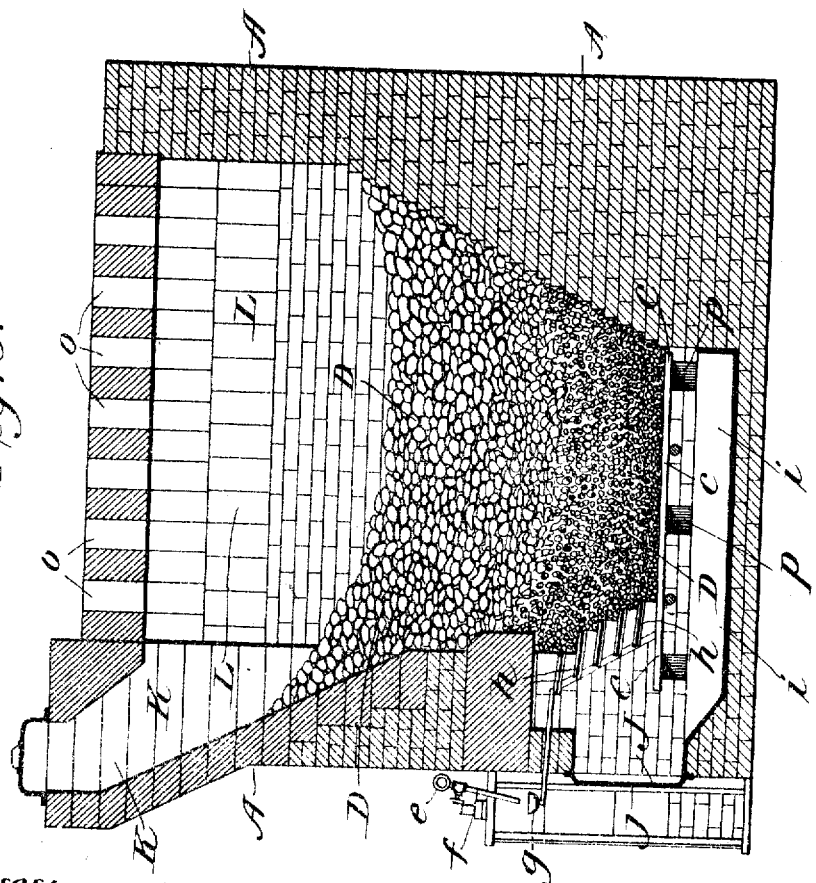
Witnesses:
A. L. O'Brien
Inventor,
Henry L. Doherty
by
Dickerson, Brown, Raegener & Binney
Attys

UNITED STATES PATENT OFFICE.

HENRY L. DOHERTY, OF MADISON, WISCONSIN, ASSIGNOR, BY MESNE ASSIGNMENTS, TO COMBUSTION UTILITIES COMPANY, OF NEW YORK, N. Y., A CORPORATION OF NEW YORK.

PROCESS OF REGULATING THE TEMPERATURE OF COMBUSTION IN GAS-PRODUCERS.

No. 829,105.  Specification of Letters Patent.  Patented Aug. 21, 1906.

Application filed October 25, 1904. Serial No. 229,910.

*To all whom it may concern:*

Be it known that I, HENRY L. DOHERTY, a citizen of the United States, and a resident of Madison, in the county of Dane and State of Wisconsin, have invented certain new and useful Improvements in Processes of Regulating the Temperature of Combustion in a Gas-Producer Furnace for Heating Retort-Ovens or for other Uses, of which the following is a specification accompanied by drawings.

This invention relates to a process for regulating the temperature of combustion in a gas-producer furnace for heating retort-ovens or for other uses; and the objects of the invention are to prevent or minimize the formation of clinkers in the furnace and secure a saving in the amount of fuel required to produce a given result.

The formation of clinkers depends on the temperature, and they are formed from a partial fluxing or fusing of the slag or incombustible portions of the fuel. They are largely composed of silicon, calcium, and iron. It has been found from experience that iron in the ash of any carbonaceous fuel produces a tendency in the fuel to readily form clinkers. The formation of clinkers can be obviated by maintaining the combustion at a temperature lower than that required for the formation of the slag or flux. In gas-producer furnaces employed for heating retorts in the regenerator form of coal-gas bench it has hitherto been customary to introduce under the grate-bars or into the mass of incandescent fuel in the furnace water or steam in order to reduce the temperature of the fuel, and thus minimize as far as possible the formation of clinkers in the bed of fuel, because these obstruct the draft through the bed and fasten themselves to the sides of the furnace-walls, impeding the process of combustion and preventing the maintenance of the proper temperature in the retorts required to carbonize the coal therein.

The use of water or water-vapor to restrain the rise of temperature throughout the bed of incandescent fuel is objectionable, because there is loss of heat due to the fact that as the water must be heated and evaporated from or about 60° Fahrenheit to steam at the temperature at which the waste gases or products of combustion ordinarily leave the furnace-stack and pass into the atmosphere—say 800° Fahrenheit or over—there is a resulting loss of about fourteen hundred B. T. U. for each pound of water thus evaporated. This is shown as follows:

| | | |
|---|---|---|
| Heat required to raise one pound of water from water at 60° Fahrenheit to 212° Fahrenheit | 152 | B. T. U. |
| Water at 212° Fahrenheit to steam at 212° Fahrenheit | 966 | B. T. U. |
| Steam at 212° Fahrenheit to steam or gas at 800° Fahrenheit (588 × .48) | 282.24 | B. T. U. |
| Total | 1,400.24 | B. T. U. |

The specific heat of the steam in the waste products of combustion at the temperature specified is approximately .48, and in the above calculations the heat of endothermic and exothermic reactions is disregarded. It will be observed in the above determination of the heat lost due to the evaporation of one pound of water no account has been taken of the amount of heat required to disassociate the steam into its elements, hydrogen and oxygen, which is an endothermic reaction, for the reason that the hydrogen is again burned back to steam in the combustion-chamber, which is an exothermic reaction, whereby the same amount of heat is given out as was absorbed in the endothermic reaction. For this reason the endo and exo thermal reactions balance each other and have therefore not been considered in this calculation.

In addition to the loss of heat occasioned by the use of water as illustrated above there is yet a more serious objection to its use as a means of preventing the formation of clinkers, due to the fact that in order to reduce the temperature throughout the entire bed of fuel below the clinkering-point it is necessary to introduce water in such a large quantity that the fuel in the immediate vicinity of the water-pan and drip-plates is reduced in temperature below that of ignition or that temperature which is necessary to support combustion. The proportion of water used per pound of fuel will vary from thirty-three and one-third per cent. to one hundred per cent. As a consequence the fuel is quenched, which fact may be observed by opening the cleaning-door of the furnace while in operation and noting the fact that scarcely any live or burning fuel is visible, the furnace presenting the appearance from below of a fire that is almost extinguished, while the fuel-bed, as viewed from above, shows that a high temperature exists in the upper part of the mass. The unburned fuel in the lower part of the fuel-bed is raked down, intermingled, and removed with the ashes, and is thus lost. Moreover, it has been found thus far impossible in this type of furnace to entirely prevent the formation of clinkers by the use of water and steam. If enough water is used to reduce the temperature below the clinkering-point, there is too great a loss of heat and fuel, while the use of an insufficient quantity of water results in excessive formation of clinkers attended with their accompanying evils. In view of these conditions the customary practice has heretofore been to admit sufficient water, and, if necessary, steam in addition, so that the formation of clinkers will be reduced to such an extent that by thoroughly cleaning the furnace at frequent intervals the fuel-bed will be maintained sufficiently free to obtain the proper amount of combustion. The cleaning of the fire is generally termed "clinkering" and in practice is attended with great labor and loss of fuel. During the operation of clinkering the cleaning-door necessarily remains wide open, permitting an excessive rush of cold air to pass up through the furnace, thus rapidly reducing the temperature of the entire structure, resulting in an alternate contraction and expansion of all the parts, which produces an increased leakage and reduces the useful period of the entire structure to a term of but a few years.

This invention entirely does away with the use of water and steam for preventing clinkering, thus obviating all the evils attendant upon their use, and the invention consists of a process of employing carbon dioxid substantially as hereinafter fully described and claimed in this specification for regulating the temperature of combustion in a gas-producer furnace for heating retort-ovens or for other purposes.

Suitable apparatus is shown for carrying out the process, in which—

Figure 1 represents in front elevation what is termed a "full-depth regenerator coal-gas bench" having a bed of full depth. Fig. 2 represents a transverse vertical section of the bench shown in Fig. 1. Fig. 3 is a vertical longitudinal cross-section on the line A A of Fig. 2. Fig. 4 is a vertical longitudinal cross-section on the line B B of Fig. 2. Fig. 5 is a vertical longitudinal cross-section on the line C C of Fig. 2. Figs. 6, 7, and 8 are respectively a plan, front elevation, and side elevation of one of the injectors which is used for the purpose of withdrawing a portion of the products of combustion from one of the waste-flues and forcing the same mixed with atmospheric air under the furnace-grate. Fig. 9 is an enlarged longitudinal cross-section view of a furnace provided with drip-plates and water-pan, illustrating graphically the condition of the fuel-bed when water is used as a cooling medium; and Fig. 10 is a vertical cross-section view of the bench similar to Fig. 2, but is diagrammatical in character in order to more clearly indicate the flow of gases in the gas-bench.

In the drawings a suitable gas-producer furnace for heating retort-ovens is illustrated in which the process may be carried out. This apparatus consists of a gas-producer furnace provided with means for supplying water under the fuel-bed in accordance with usual practice, because I wish to show how my improved process may be substituted for the old water process without changing the apparatus. In Fig. 9 I have illustrated graphically the condition of the fuel-bed when water is used as a cooling medium, showing how the fuel in the lower portion of the bed is quenched by the water. In Fig. 9 the lower portion of the fuel-bed is shown very much darker and blacker than the remainder of the fuel in the bed to illustrate the quenching effect of the water. This improved process may be carried out in any suitable form of apparatus, and that shown in the drawings is by way of illustration only.

Referring to the drawings, A represents a gas-producer furnace for heating retort-ovens, in which B represents the retorts suitably supported in the oven, and C represents the grate-bars to support the fuel-bed D.

J is the ash-pit door, and K is the fuel-chute for feeding fuel to the fuel-bed.

The space above the fuel-bed in chamber L is connected by a series of nostrils O with the secondary combustion-chamber P, to which the secondary air-supply is led through the nostrils Q. The secondary air-flues R communicate with the atmosphere at the lower portion of the furnace by means of the apertures S, controlled by the secondary air-dampers T. The secondary air-flues, as shown, are provided with horizontal partitions U, having staggered air-flues V. These secondary air-flues, together with the waste-flues W, form the recuperator, and, as shown, the waste-flues in this instance are arranged outside of the secondary flues R and are also provided with horizontal partitions X, having staggered openings Y. The waste-flues communicate with the oven in the upper portion of the bench by suitable passages Z, formed at the baffle-plates a. At the lower portion of the bench the waste-flues communicate with the stack b by suitable passages c. The circulation of gases after complete combustion in the secondary combustion-chamber P follows the arrows and passes from the combustion-chamber P up and around and between the retorts B, down through the waste-flues, and out through the stack, which, as shown, is controlled by a suitable damper $d$.

$e$ represents a water-pipe provided with a nozzle $f$, emptying into a cup $g$, from which a pipe leads to the drip-plates $h$. Beneath the fuel-bed is shown the water-pan $i$. In the usual method in which water is used the water is kept continually flowing through the nozzle $f$ and onto the drip-plates $h$, and the water in the pan is replenished at frequent intervals by suitable means. In the front elevation, Fig. 1, the mouthpieces E of the retorts are shown, having stand-pipes F connected thereto leading to the hydraulic main G. Peek-hole fittings H, provided with removable plugs, are shown for looking into the oven in the upper part of the bench, and other peek-hole fittings I are provided for inspecting and cleaning out other portions of the bench. The waste-flues are also provided with peek-hole fittings I'.

In a bench of ordinary construction utilizing the water process for minimizing clinkering atmospheric air would be admitted to the grate through the apertures $o$ in the front of the furnace provided with dampers $o'$. These apertures $o$ lead to the passages $p$, which communicate with the space beneath the grate. In Fig. 10 the circulation system is shown diagrammatically with the omission of the cross-partitions in the recuperator.

According to this invention instead of using water and steam to reduce the temperature and prevent the formation of clinkers I introduce into the bed of incandescent carbonaceous fuel a decomposable gas, preferably containing oxygen, preferably carbon dioxid, ($CO_2$,) which may be used either alone or mixed with other gases. The carbon dioxid ($CO_2$) is preferably intimately commingled at or before its introduction to the fuel-bed with the oxygen used to support combustion, which latter is practically introduced in the form of atmospheric air. It is of course economical to lead the gaseous mixture to the fuel-bed in a somewhat heated state, and preferably the heat should be furnished from a source of waste heat. A portion of the waste products of combustion may be intercepted after they have been used for heating the retorts B and, if necessary, after they have heated the secondary air supplied to the combustion-chamber P of the furnace. This intercepted portion of the products of combustion, together with the air thus required to support combustion, is led beneath the grate C of the furnace. The carbon dioxid thus introduced passes up through the bed of burning fuel and is disassociated, forming carbon monoxid, (CO,) thus $CO_2 + C = 2CO$. This chemical disassociation of the carbon dioxid or endothermic reaction absorbs heat and maintains the temperature of the incandescent bed of fuel at the desired point. Preferably no air is admitted to the top of the fuel-bed in the chamber L, because the draft is upward through the nostrils O to the combustion-chamber. In carrying out this process in the gas-bench shown in the drawings passages $s$ are provided in the wall of the bench leading to the waste-flues W, so that a portion of the waste products of combustion may be withdrawn from the flues, mixed with atmospheric air, and introduced beneath the grate through the apertures $o$. Any suitable means may be provided for introducing the mixture beneath the grate, as shown, in this instance an air-injector being used, the construction of which is illustrated in Figs. 6, 7, and 8. This injector is preferably so constructed that it may be placed against the side of the bench and register with the openings $s$ for withdrawing the products of combustion and with the apertures $o$ for injecting the mixture. The injector is provided with a nozzle with which a pipe $u$ communicates, provided with a valve $v$. The nozzle $t$ injects air into the passage $w$, adapted to communicate with the aperture $o$ for the injection of the mixture. Opposite the nozzle $t$ is arranged a damper $x$ for regulating the supply of air for the mixture. A constant pressure of air is maintained upon the supply-pipe $u$, and the amount of air supplied to the mixture is regulated by the damper $x$. In carrying out the process preferably two injectors are used with a bench of the character described, one at each side, but one being illustrated in the drawings for the sake of clearness.

I have discovered that the temperature throughout the entire incandescent bed of fuel may be kept down to a point at which clinkering will not occur by utilizing the heat-absorbing effect occurring in the chemical disassociation of the carbon dioxid, and this is one of the essential features of the process. In carrying out the process the mixture of carbon dioxid and oxygen should be led beneath the fuel-bed at such temperature and the proportions of carbon dioxid, free oxygen, and free nitrogen should be such that the fuel is kept below the temperature at which clinkering occurs, heat being given up to the gases from the fuel. This temperature at which clinkering commences to form varies from about 1,500° Fahrenheit to about 2,300° Fahrenheit, depending upon the character of the fuel and the amount of iron and silicon therein. I have found that a mixture of about four per cent. $CO_2$, sixteen per cent. free oxygen, and eighty per cent. free nitrogen at temperature of about 600° Fahrenheit is suitable for carrying out my improved process with a certain character of fuel which clinkers at a high temperature, and another mixture of about ten per cent. $CO_2$, ten per cent. free oxygen, and eighty per cent. free nitrogen at a temperature of about 700° Fahrenheit has also been found suitable with another character of fuel which clinkers at a much lower temperature. The higher the temperature of the gaseous mixture admitted beneath the fuel-bed the larger should be the proportion of $CO_2$ in the mixture, which is necessary to keep the temperature of the fuel-bed below the clinkering-point. I have found that the mixture of $CO_2$, free oxygen, and free nitrogen operates satisfactorily if injected at a temperature of from 600° Fahrenheit to about 800° Fahrenheit, in which case heat is given up to the gas from the fuel and clinkers are not formed. If the $CO_2$ is taken from some source other than the waste products of combustion, the percentage of nitrogen may be either decreased or increased from the proportions stated. If the temperature of the mixture of air and gases supplied to the fuel-bed is considerably less than the temperature of the fuel-bed, the gases will in themselves, as well understood, effect the physical absorption of some heat from the fuel-bed.

In an ordinary gas-producer furnace the temperature of incomplete combustion is usually carried on at approximately from 1,800° to 2,000° Fahrenheit, while the temperature of complete combustion carried on in the combustion-chamber P, where the secondary air-supply is admitted, will usually be considerably higher, frequently 2,500° Fahrenheit or more. If the gas-producer is used to heat retorts, as illustrated in the drawings, the temperature of the retorts should be about 2,300° Fahrenheit, and the waste products of combustion after circulating around the retorts enter the top of the recuperator at about 2,000° Fahrenheit to about 2,200° Fahrenheit. These products of combustion are cooled down in the recuperator before entering the chimney to about 800° Fahrenheit to about 1,000° Fahrenheit, and a portion of said products are intercepted at some suitable point after heating the retorts and mixed with air which is at atmospheric temperature, so that the mixture injected will range about 600° Fahrenheit to 800° Fahrenheit. If the gas-producer is not used for heating retorts, the products of incomplete combustion may be first led to an engine or other suitable device in order that they may be deprived of a portion of their heat and be suitably reduced in temperature before their introduction into the incandescent fuel. As the appearance of the fire-bed furnishes a direct guide to the temperature that is being maintained therein, it also furnishes the best guide for proportioning the quantity of $CO_2$ admitted to get the lowest temperature desirable, it being preferable to admit a little more rather than a little less $CO_2$.

Another feature of the process resides in the fact that carbon dioxid on account of its low thermal capacity absorbs but little heat until the temperature of disassociation is reached, which is far in excess of that at which the fuel becomes extinguished. With the use of water, however, a large part of the heat is absorbed at a temperature of 212° Fahrenheit while the water is passing from water to steam, which operates to produce a quenching effect on the fuel, as hereinbefore stated.

I have illustrated the furnace provided with drip-plates and water-pan for two reasons—i. e., to show that the process may be carried out in furnaces as now constructed with a minimum of alteration and expense, and, secondly, to show that my new process may be used, if desired, in connection with the old water process, so that a gas of lower hydrogen content may be produced than in the old process if this should for any reason be deemed desirable. It has been found in actual practice with my improved process that the saving of fuel amounts to twenty per cent. and over with average fuel.

By comparison with Jacob Reese's patent dated December 16, 1884, wherein is set forth a process which consists in returning some of the gases from directly above the bed of fuel through a combustion-chamber and back under the fire at an excessively-high temperature, stated to be "generally sufficiently high to fuse the slag and cause it to flow in a liquid condition out of the slag-vent," one point of novelty of my process—to wit, limiting the temperature to one at which clinkers will not even be formed to any considerable amount, much less fused—will be apparent; so, also, Todd patent of December 24, 1872, which describes a process for treating gases and fumes to convert them "while still highly heated" and in which it is claimed the products of combustion "pass through and heat a transformer" will aid in showing the same. Again, a British provisional patent to Kidd, No. 3,174 of 1874, though apparently abandoned without being completed, sets forth that products of combustion are forced through a lower layer of fuel in a second or decomposing chamber and soon raise the fuel therein to a "white heat" under conditions quite at variance with the present invention. This also shows the wide distinction between the productions of high temperatures and the limitation of the fire-bed temperature which I accomplish. Indeed, the literature of this art shows that one Blanchard has even proposed to produce "the most intense heat attainable" by introducing carbon dioxid and air at various parts of an inclosed furnace and has stated that the upper portion of the fuel on the grate is thereby "raised to an intense incandescent heat" sufficient to permit the gases admitted below the grate to pass through without cooling the fire below the desired intensity. So, also, in smoke-consuming processes it has been suggested frequently that some of the unburned products, with of course carbon dioxid, be returned through the fire-bed to produce an intense and more complete combustion. Here it will be seen that utterly different objects and processes are accomplished. Consideration of such processes or supposed processes will show that my present invention is radical. It is distinguished widely therefrom by the fact that I combine with a heat economy, impossible in the use of water or steam for cooling the bed of fuel, the absolute and easy control and limitation of the temperature in a remarkably even manner below that at which clinkers are formed in objectionable quantities. In short, I lower the temperature of the fuel-chamber with a great increase instead of a decrease of economy.

As different qualities of coal and coke vary considerably in respect to the tendency to produce clinkers and in respect to the temperatures at which clinkers will be formed, it will be evident that fuel that less readily forms clinkers may be burned at a higher temperature under the present process either with less proportion of carbon dioxide introduced or with higher temperature of the air and gases admitted.

One great cause of clinkers is that under the old method thin places or draft-holes occur in the fuel-bed, and consequently the rush of air through this path of low resistance causes localized rapid combustion, producing intense temperature and resulting in the rapid formation of clinkers. By the use of my process an opposite effect is produced, because in case there should occur a thin spot or path of low resistance to the passage of the draft the carbon dioxid present would reduce the temperature and rate of combustion at this point, and consequently the path of low resistance would gradually disappear.

The principles of nature that underlie the process seem to be that the reduction of carbon dioxid is an endothermic reaction that absorbs heat chemically, and the introduction of a large volume of gases that do not support combustion, with the oxygen at a temperature much below that of the fire-bed, absorbs heat physically, while, on the other hand, the oxidizing of the carbon of the fuel to carbon monoxid (much more if to carbon dioxid) within the fuel-bed by the oxygen introduced evolves heat. Some heat of course is lost by transmission and radiation through the furnace-walls; but this should not be considerable and is notably less with my lower temperature. The temperature seems to be maintained constant (so far as horizontal distribution is concerned) by the equilibrium of the heat losses, on the one hand, and the heat evolution, on the other hand, and the process is to a large degree self-regulating, as any increase in temperature at any part of the fuel-bed is opposed by an increased reduction of carbon dioxid at that spot. It is probable that less total carbon dioxid escapes from the bed than enters it, which would mean that a very considerable amount of heat energy is taken up in the endothermic reaction of reducing some of the carbon dioxid, in which event all the oxygen of the air passing through the bed may be considered and figured as converted into carbon monoxid. If so, we have the evolution of heat by combustion of the oxygen to carbon monoxid set against all the physical losses and against the chemical loss of all the net reduction of carbon dioxid to monoxid. As this effect increases with the temperature, it follows that there is one stable mean temperature for the fire-bed which will be reached and maintained for each particular proportion of gases admitted, (other conditions being alike.)

While the temperature at which clinkering occurs is not an absolutely definite temperature even for the same grade of fuel, I use the expression "clinkering temperature" to designate a temperature which is very much less than that at which the clinkers or slag can be entirely fused and which does not exceed that at which an objectionable amount of clinkers will be formed. It is sufficiently definite under any given conditions to be clear to an engineer.

It will be seen that to a certain extent the temperature of the admitted gases and the quantity of $CO_2$ introduced are interchangeable factors, for the higher the temperature of the air and gas supplied the larger proportion of carbon dioxid will be required to properly limit the temperature, and vice versa. Furthermore, it will be understood by engineers that time, as well as temperature, is a factor in the reduction of the carbon dioxid to monoxid in the fuel-bed. Therefore with an increased velocity of the gases in the fuel-bed or with decreased thickness of fuel-bed a somewhat greater proportion of carbon dioxid is necessary than with lower velocities and thicker fuel-beds. Moreover, it will be seen that the present invention can be advantageously used in many different ways—as, for example, in a large fuel-bed different proportions of carbon dioxid may be introduced at different parts to maintain different temperatures.

As it is evident that the present process might be used by parties thinking to evade my patent in conjunction with some water or steam, so as to enable them to use less carbon dioxid, but for the same object and in the same way as herein described, it is clear that in the broader of my process claims I do not mean to define the invention by the proportions except as the proportions can be and are in practice determined by the temperature produced, for by means of that temperature the operator is directly informed as to whether to increase or to decrease the supply of carbon dioxid.

This application is for the same invention as that set forth in my copending application, Serial No. 187,318, filed December 31, 1903, with additional details.

What I claim, therefore, and desire to secure by Letters Patent as the characteristic features of my invention, are the following:

1. The herein-described process which consists in making producer-gas from a deep bed of fuel with a draft-current containing free oxygen and a neutral diluent fixed endothermically-reacting gas in predetermined proportion and regulating the temperature of the draft-current with reference to the endothermic capacity of the gas and the exothermic power of the oxygen in such manner as to maintain the temperature in the producer at a point where the fuel will burn with substantial completeness to an ash.

2. The herein-described process which consists in making producer-gas from a deep bed of fuel with a draft-current containing products of combustion and free oxygen in predetermined proportions, and so regulating the temperature of said products with reference to their richness in carbon dioxid, and the exothermic power of the free oxygen as to maintain the hottest portions of the fuel-bed below the clinkering-point of the particular kind of fuel employed.

3. The herein-described process which consists in making combustible gas in a deep bed of fuel with a draft-current of endothermically-reacting fixed gas and free oxygen and so regulating the temperature and composition of the draft as to maintain the fuel-bed substantially free from obstruction by slag.

4. The herein-described process of making combustible producer-gas which consists in conducting combustion within a deep bed of fuel by an artificially-accelerated draft-current of free oxygen and an endothermically-reacting fixed diluent gas, so regulated with reference to the temperature and richness of the diluent and the proportion which said diluent bears to the free oxygen, as to maintain the temperature of the producer below the slagging-point of the fuel.

5. The herein-described process of gas-making which consists in operating a gas-producer under artificially-accelerated draft and suppressing the tendency to temperature rise within the fuel-bed by the employment of a fixed gaseous endothermically-reacting agent present in predetermined ratio to the combustion-supporting oxygen, and whose temperature is such with reference to its endothermic capacity as to avoid objectionable slagging of the fuel.

6. The herein-described process of making combustible producer-gas, which consists in conducting combustion within a deep fuel-bed by means of air and carbon dioxid, and separately regulating the proportions of said ingredients so as to avoid the objectionable slagging of the fuel, and conducting said gas unburned to the point of use.

7. The hereinbefore-described process of making combustible producer-gas which consists in conducting combustion within a deep fuel-bed by means of air and carbon dioxid, regulating the proportion between the quantity of air and carbon dioxid introduced into the producer, and regulating the amount of such mixture of air and carbon dioxid so as to avoid objectionable slagging of the fuel and conducting said gas unburned to the point of use.

8. The hereinbefore-described process of making combustible producer-gas which consists in conducting combustion within a deep fuel-bed by means of air and carbon dioxid, and regulating the proportion of each with respect to the amount of coal to be consumed in the producer and its quality so as to avoid the objectionable slagging of the fuel and conducting said gas unburned to the point of use.

9. The hereinbefore-described process of making combustible producer-gas which consists in conducting combustion within a deep fuel-bed by means of air and carbon dioxid, and separately regulating the amounts of said ingredients to fix the proportion between them so as to avoid objectionable slagging of the fuel, and conducting said gas unburned to the point of use.

10. The herein-described process which consists in making producer-gas from a deep bed of fuel with a draft-current containing oxygen, nitrogen, and carbon dioxid, and proportioning the carbon dioxid with reference to the temperature of the draft and the slagging qualities of the fuel to determine and maintain the temperature equilibrium occurring between the heat produced in the fuel-bed by the reaction of the free oxygen and carbon mainly to produce carbon monoxid and the heat absorbed by the endothermic and physical actions at a temperature below the objectionable slagging or clinkering temperature of the fuel.

11. The herein-described process of making combustible producer-gas which consists in conducting combustion within a deep fuel-bed by means of oxygen, nitrogen, and carbon dioxid, and proportioning or regulating the ratio of carbon dioxid and oxygen so as to avoid objectionable slagging of the fuel by restricting the temperature of equilibrium occurring between the heat-producing combustion of the oxygen mainly to carbon monoxid, and the physical and endothermic heat-absorbing actions, and conducting the combustible gases evolved to the point of use.

12. The herein-described process of making combustible producer-gas which consists in conducting combustion within a deep fuel-bed by means of air and carbon dioxid, and in regulating and controlling the proportions of said ingredients so as to avoid objectionable slagging of the fuel and conducting said gas unburned to the point of use.

13. The herein-described process of regulating and controlling combustion in making producer-gas which consists in conducting combustion of oxygen and carbonaceous fuel mainly to produce carbon monoxid in the presence of carbon dioxid, and in maintaining the temperature equilibrium occurring between the heat-producing and the heat-absorbing actions in the fuel-bed at a temperature below the objectionable clinkering temperature of the fuel by introducing to a deep bed of the fuel a draft essentially of air and products of combustion and by so regulating and proportioning the ratio of products of combustion and air with reference to the temperature of the draft and the slagging qualities of the fuel, substantially as described, as to limit the temperature as aforesaid.

14. The improvement in the art of making producer-gas which consists in conducting and regulating the combustion and in equalizing the distribution of temperature and preventing excessive temperature locally in parts of the fuel-bed by supporting the combustion by a draft containing air and products of combustion in a determinate ratio and at a determinate temperature, substantially as described, such that the equilibrium between the heat-producing actions and the heat-reducing actions will occur and be maintained at a temperature below the objectionable slagging or clinkering temperature of the fuel and whereby the local rise of the temperature at any point in the bed is prevented by the increased endothermic effect of the carbon dioxid present.

15. The improvement in the art of making producer-gas which consists in conducting and regulating the combustion and in equalizing the distribution of temperature to prevent excess locally in parts of the fuel-bed by supporting the combustion by a draft containing air and products of combustion in a determinate ratio and at a determinate temperature, the percentage of carbon dioxid present being not less than five per cent. nor more than fifteen per cent.

16. The improvement in the art of making producer-gas which consists in conducting and regulating the combustion and equalizing the distribution of temperature to prevent excess locally in parts of the fuel-bed by supporting the combustion by a draft containing air and products of combustion in a determinate ratio and at a determinate temperature, the percentage of carbon dioxid present being not less than five per cent. nor more than fifteen per cent., the percentage of carbon dioxid being such in respect to the temperature of the draft as to restrict the temperature of the fuel-bed below the objectionable clinkering temperature and less carbon dioxid being given off above the fuel-bed than is introduced below it, whereby substantially all the free oxygen introduced is converted into carbon monoxid with some attendant reduction of the carbon dioxid that is introduced.

17. The improvement in the art of making producer-gas which consists in conducting and regulating the combustion and equalizing the distribution of temperature to prevent excess locally in parts of the fuel-bed by supporting the combustion by a draft containing air and products of combustion without adding steam in a determinate ratio and at a determinate temperature, the percentage of carbon dioxid present being not less than five per cent. nor more than fifteen per cent., the percentage of carbon dioxid being such in respect to the temperature of the draft as to restrict the temperature of the fuel-bed below the objectionable clinkering temperature and less carbon dioxid being given off above the fuel-bed than is introduced below it, whereby substantially all the free oxygen introduced is converted into carbon monoxid with some attendant reduction of the carbon dioxid that is introduced.

18. The herein-described process which consists in making producer-gas within a deep bed of fuel with a draft-current containing free oxygen and products of combustion strong in carbon dioxid as compared with what occurs in metallurgical furnaces, at a temperature sufficient to avoid clogging of the producer from high temperature causes.

19. The herein-described process which consists in making producer-gas within a deep bed of fuel, burning said fuel with substantial completeness to an ash by the employment of an artificially-accelerated draft-current containing air and furnace-gases strong in carbon dioxid as compared with those in metallurgical furnaces, and retaining the temperature of furnace-gases except for the natural loss by radiation, and in its flues through which gases are drawn, the proportion of said products being sufficient to maintain the temperature of the producer below the slagging-point of the fuel therein by the cooling action of said product for substantially the purposes set forth.

20. The herein-described process of making and using producer-gas which consists in burning said gas in a furnace in the usual manner with a substantial excess of air to secure complete combustion, conducting combustion within a deep body of fuel with a draft-current containing the products of combustion from said furnace, of a richness in carbon dioxid exceeding six per cent. and at a temperature when mixed with the air sufficient to maintain the temperature of the producer below the slagging-point of the fuel therein.

In testimony whereof I have signed this specification in the presence of two subscribing witnesses.

HENRY L. DOHERTY.

Witnesses:
A. B. SULLIVAN,
EUGENE Y. SAYER.